Patented Nov. 7, 1950

2,528,493

UNITED STATES PATENT OFFICE 2,528,493

INSECTICIDE COMPRISING ROTENONE AND (BUTYLCARBITYL) (6-PROPYL PIPERONYL) ETHER AS A SYNERGIST THEREFOR

Loyd W. Brannon, deceased, late of Norfolk, Va., by Leila Brannon, executrix, North Ingleside, Va.; dedicated to the free use of the People in the territory of the United States No Drawing. Application June 8, 1948,
Serial No. 34,846

1 Claim. (Cl. 167—24)

(Granted under the act of March 3, 1883, as amended April 30, 1928; 370 O. G. 757)

This application is made under the act of March 3, 1883, as amended by the act of April 30, 1928, and the invention herein described and claimed, if patented in any country, may be manufactured and used by or for the Government of the United States of America for governmental purposes throughout the world without the payment of any royalty thereon.

The invention herein described is hereby dedicated to the free use of the people in the territory of the United States to take effect on the granting of a patent.

This invention relates to insecticidal compositions, more particularly to insecticidal compositions containing rotenone, and has among its objects the provision of such insecticidal compositions wherein the effectiveness of rotenone is enhanced by combining it with certain synthetic organic compounds, sometimes designated as activators or synergists. Other objects and advantages will be apparent from the description of the invention.

Rotenone has long been known as an effective insecticide. It has certain disadvantages however, among which are its cost and the high concentrations needed to obtain 100 percent mortality of certain species of insects.

It has been found that when a rotenone material, which may be either pure rotenone or a rotenone-containing plant material, such as derris and cube root, as the essential active ingredient, is combined with either (butylcarbityl) (6-propyl piperonyl) ether having the following Formula I

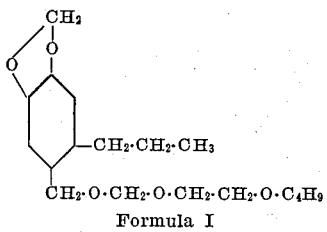

Formula I or with a mixture consisting essentially of the compound having the following Formula II

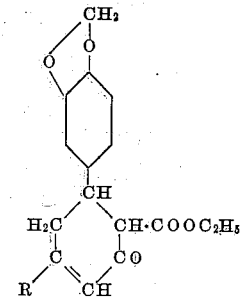

Formula II and the compound having the following Formula III

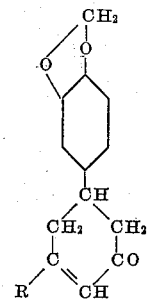

Formula III wherein R is an alkyl group containing from 4 to 6 carbon atoms, such as isoamyl, the resulting composition has an insecticidal value far greater than would be expected as a result of the additive effect of the components. The high insecticidal efficacy of the composition is especially surprising in view of the fact that the aforementioned compounds represented by Formulas I, II, and III, possess very little insecticidal value in and of themselves. Thus, it was found that powders comprising rotenone, a compound of Formula II, a compound of Formula III, sulfur, and an inert carrier such as pyrophyllite, and powders comprising rotenone (butylcarbityl) (6-propyl piperonyl) ether (Formula I), sulfur, and pyrophyllite, are far more effective in killing the Mexican bean beetle, *Epilachna varivestis* Muls., than would be expected from the insecticidal value of any of the components alone. There is a high degree of activation of the rotenone dusts by these products.

Powders were prepared by mixing a given amount of cube root powder containing 3.6 percent of rotenone and a given amount of a dust base containing piperonyl cyclonene (a known composition consisting essentially of a mixture of a compound of Formula II and the compound of Formula III wherein R is isoamyl, and which may be respectively named isoamyl-5-(3,4-methylenedioxy)-phenyl-3-carbethoxy-2-cyclohexen-(5)-one-3 and isoamyl-5-(3,4-methylenedioxy)-phenyl-3-cyclohexen-5-one) or (butylcarbityl)-(6-propyl piperonyl) ether (Formula I) on walnut-shell flour with the desired amount of sulfur and pyrophyllite. The resulting powders were dusted on snap beans heavily infested by the Mexican bean beetle. Several replicas of each treatment were made. Examinations for surviving bean beetle larvae and pupae were made 11 days after the last application. In the following table are shown the insecticidal results obtained with powders prepared and tested as described. The results are stated in terms of percent control as determined by reductions of surviving larvae and pupae on treated compared with untreated plots.

| Dust Mixtures (Ingredients in pyrophyllite) (Percent by Weight) | Rate per Acre | Yield per Acre | Larvae and Pupae Surviving on 10 Plants | Control of Larvae |
|---|---|---|---|---|
| | Pounds | Bushels | Number | Percent |
| Rotenone 0.125, piperonyl cyclonene 0.5, sulfur 25 | 20 | 167 | 5 | 98 |
| Rotenone 0.5, DDT 3, sulfur 50 | 23 | 168 | 11 | 96 |
| Rotenone 0.125, (butylcarbityl) (6-propyl piperonyl ether 0.5, sulfur 25 | 21 | 144 | 35 | 86 |
| Rotenone 0.125, sulfur 25 | 20 | 101 | 263 | |
| Check (untreated) | | 103 | 253 | |
| Difference required for significance (odds 19:1) | | 33 | 47 | |

It will be seen from the table that in every case the composition comprising rotenone (contained in cube powder) and either synergist, that is piperonyl cyclonene or (butylcarbityl) (6-propyl piperonyl) ether, possessed a definitely greater insecticidal value than the rotenone alone, results being comparable with the currently recommended rotenone concentration of 0.5 percent. For example, 0.125 percent of rotenone alone, applied as described, gave no control of the insect. However, by combining this with a concentration of either of the two above-mentioned synergists, which in themselves are at the most only very slightly toxic, compositions were obtained that gave 98 and 86 percent control of the bean beetle compared with 90 percent control with the currently recommended 0.5 percent rotenone concentration. Similar results have been obtained in other tests conducted in 1947.

The proportion of rotenone and the synergists may be varied over a wide range, although a ratio of 0.1 to 0.75 part of rotenone to 0.5 part of synergist, by weight, is preferred. Other carriers commonly used in the insecticidal art, such as aqueous emulsions, and so forth, can be used in place of the dust carrier. The compositions may be used in combination with other insecticides. Results of other tests conducted during the season show that in general these synthetic organic compounds tested alone were at the most only very slightly toxic.

Having thus described the invention, what is claimed is:

An insecticide comprising from 0.1 to 0.75 percent, by weight, of rotenone and (butylcarbityl)-(6-propyl piperonyl) ether as a synergist therefor.

LEILA BRANNON.
*Executrix of the Last Will and Testament of Loyd W. Brannon, Deceased.*

REFERENCES CITED

The following references are of record in the file of this patent:

UNITED STATES PATENTS

| Number | Name | Date |
|---|---|---|
| 2,265,156 | Geary | Dec. 9, 1941 |

OTHER REFERENCES

Wachs, Science, vol. 105, pages 530–531 (1947).

Synerholm et al., Contributions from Boyce-Thompson Inst., vol. 13, pages 433–442 (1945).

Chem. & Eng. News, vol. 25, No. 40, Oct. 6, 1947, page 2883.